(12) United States Patent
Marrano et al.

(10) Patent No.: US 12,241,412 B1
(45) Date of Patent: Mar. 4, 2025

(54) INLET GUARD SCREEN FOR AN INLET OF AN AIRCRAFT ENGINE

(71) Applicant: PRATT & WHITNEY CANADA CORP., Longueuil (CA)

(72) Inventors: Roberto Marrano, Boucherville (CA); Mark Cunningham, Montreal-West (CA); Eray Akcayoz, Côte-Saint-Luc (CA); Corentin Brette, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/481,705

(22) Filed: Oct. 5, 2023

(51) Int. Cl.
  *F02C 7/055* (2006.01)
  *B64D 33/02* (2006.01)

(52) U.S. Cl.
  CPC ........ *F02C 7/055* (2013.01); *B64D 2033/022* (2013.01); *B64D 2033/0233* (2013.01)

(58) Field of Classification Search
  CPC ....................................................... F02C 7/055
  See application file for complete search history.

(56) References Cited

U.S. PATENT DOCUMENTS

| | | | |
|---|---|---|---|
| 2,835,342 A | | 5/1958 | Hockert |
| 2,931,460 A | | 4/1960 | Benjamin |
| 6,824,582 B2 * | 11/2004 | Wilson | ............... B01D 46/0005 55/471 |
| 6,959,552 B2 * | 11/2005 | Leblanc | .................. F02C 7/055 137/15.1 |
| 10,273,881 B2 | | 4/2019 | Dornier et al. |
| 10,364,746 B2 * | 7/2019 | Srinivasan | ............... F01D 25/24 |
| 11,313,277 B2 * | 4/2022 | Valencia | .................. F02C 7/055 |
| 2004/0112020 A1 * | 6/2004 | Wilson | ................. B01D 46/521 55/498 |
| 2005/0204743 A1 * | 9/2005 | Leblanc | .................. F02C 7/055 60/726 |
| 2016/0281601 A1 * | 9/2016 | Sirinivasan | ........... F04D 29/701 |
| 2021/0381434 A1 * | 12/2021 | Valencia | .................. F02C 7/055 |

FOREIGN PATENT DOCUMENTS

| | | |
|---|---|---|
| CN | 204436595 U | 7/2015 |
| GB | 757724 A | 9/1956 |

OTHER PUBLICATIONS

Choi—KR 20160110288 A + machine translation (Year: 2016).*

* cited by examiner

*Primary Examiner* — Juan G Flores
(74) *Attorney, Agent, or Firm* — NORTON ROSE FULBRIGHT CANADA LLP

(57) ABSTRACT

A system for an aircraft includes an aircraft engine having a central axis with a flowpath projecting into the aircraft engine from an airflow inlet. An inlet plenum at the airflow inlet extends between a front wall and a rear wall along the central axis. An inlet guard is arranged at the airflow inlet and extends across the flowpath. The inlet guard includes a first screen extending circumferentially about the central axis. The first screen has a first screen axial width L1 extending from the front wall to the rear wall. The inlet guard further includes a second screen extending at least partially circumferentially about the central axis. The second screen is disposed radially outward of the first screen and axially overlaps the first screen. The second screen has a second screen axial width L2 less than the first screen axial width L1.

20 Claims, 4 Drawing Sheets

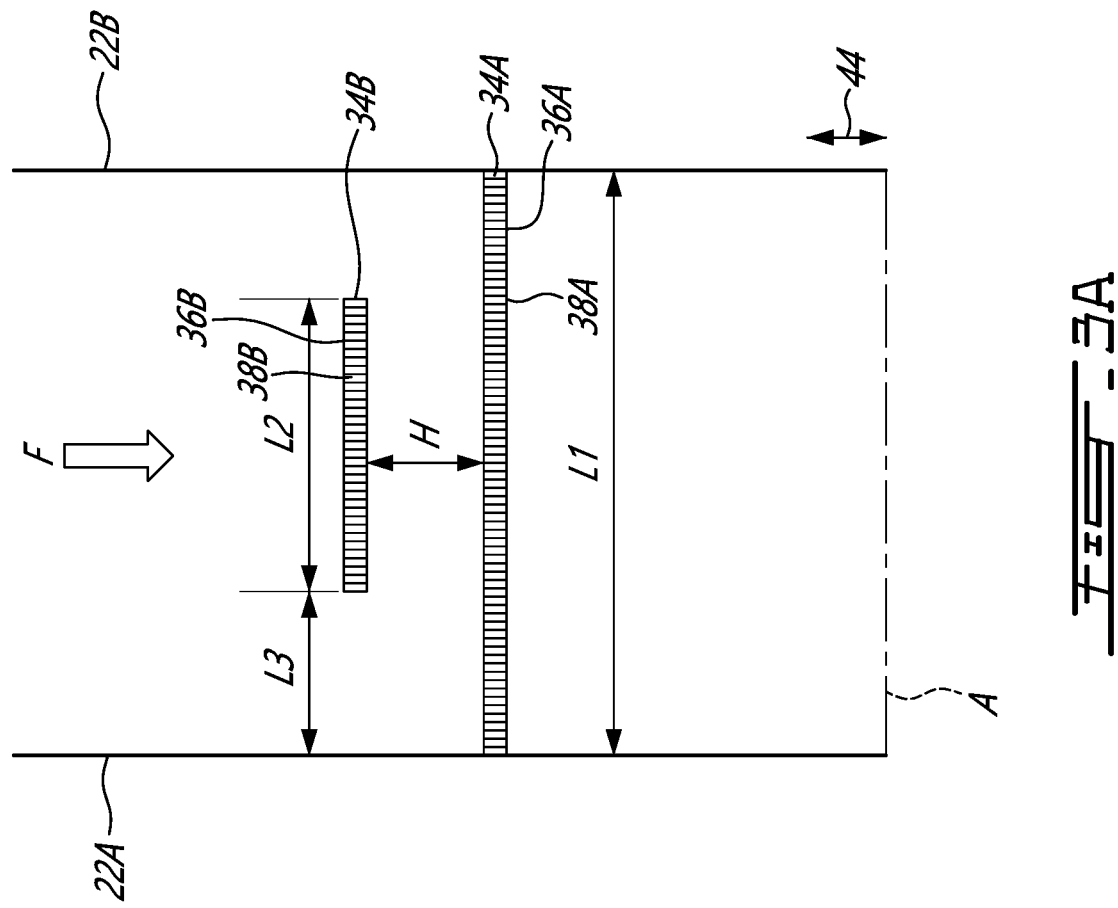

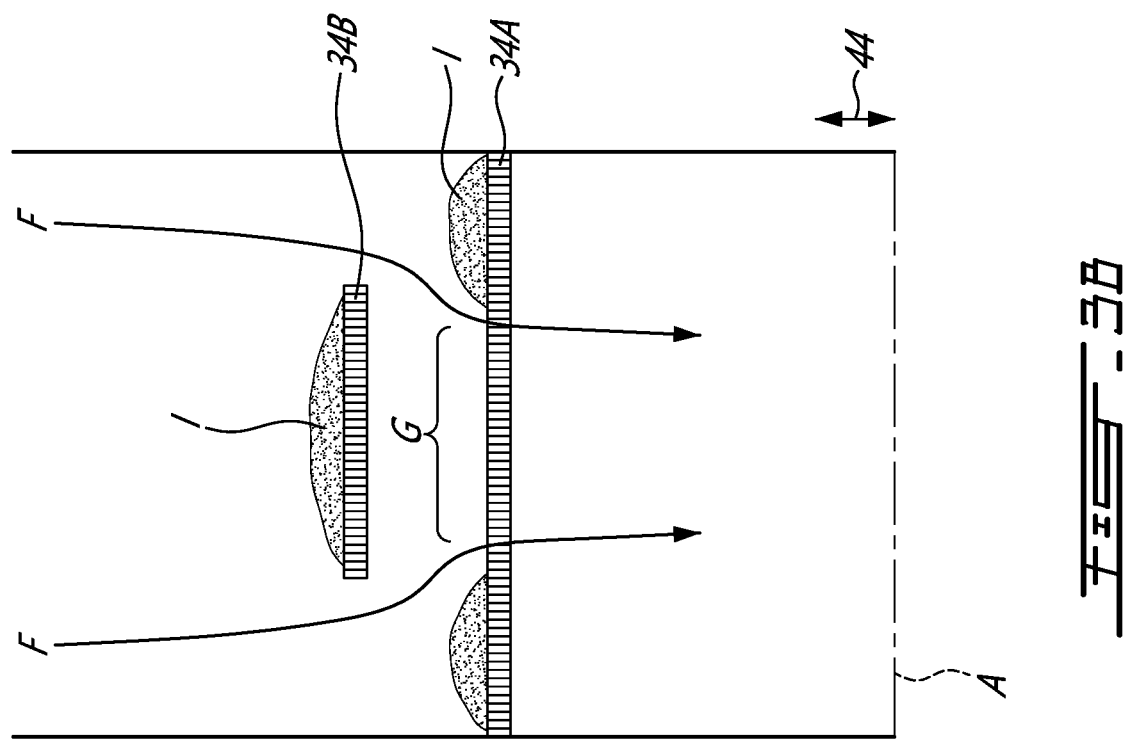

INLET GUARD SCREEN FOR AN INLET OF AN AIRCRAFT ENGINE

TECHNICAL FIELD

The disclosure relates generally to an aircraft engine and, more particularly, to a guard screen for an airflow inlet of the aircraft engine.

BACKGROUND

A gas turbine engine may include an inlet guard screen at an inlet into the gas turbine engine. This guard screen may prevent or reduce ingestion of foreign object debris into the gas turbine engine. While known guard screens have various advantages, there is still room in the art for improvement.

SUMMARY

In one aspect, there is provided a system for an aircraft, comprising: an aircraft engine having a central axis with a flowpath projecting into the aircraft engine from an airflow inlet; an inlet plenum at the airflow inlet extending between a front wall and a rear wall along the central axis; and an inlet guard arranged at the airflow inlet and extending across the flowpath, the inlet guard including a first screen extending circumferentially about the central axis, the first screen having a first screen axial width L1 extending from the front wall to the rear wall, the inlet guard further including a second screen extending at least partially circumferentially about the central axis, the second screen disposed radially outward of the first screen and axially overlapping the first screen, the second screen having a second screen axial width L2 less than the first screen axial width L1.

In another aspect, there is provided system for an aircraft, comprising: an aircraft engine having a central axis including a compressor section, a flowpath projecting into the aircraft engine from an airflow inlet and through the compressor section; an inlet plenum at the airflow inlet, extending between a front wall and a rear wall along the central axis; and an inlet guard arranged at the airflow inlet and extending across the flowpath, the inlet guard including a first screen extending circumferentially about the central axis, the first screen having a first screen axial width L1 extending from the front wall to the rear wall, the inlet guard further including a second screen extending at least partially circumferentially about the central axis, the second screen disposed radially outward of the first screen and axially at a location between the front wall and the rear wall, the second screen having a second screen axial width L2 less than the first screen axial width L1.

In a further aspect, there is provided a system for an aircraft, comprising: an aircraft engine having a central axis with a flowpath projecting into the aircraft engine from an airflow inlet; and an inlet guard configured to reduce ingestion of foreign objects debris by the aircraft engine, the inlet guard including a first screen extending circumferentially about the central axis, the first screen having a first screen axial width L1, the inlet guard further including a second screen extending at least partially circumferentially about the central axis, the second screen disposed radially outward from and at a radial height H away from the first screen, the second screen axially overlapping a portion of the first screen, the second screen having a second screen axial width L2 less than the first screen axial width L1.

BRIEF DESCRIPTION OF THE DRAWINGS

Reference is now made to the accompanying figures in which:

FIG. 3A is a side schematic cross sectional view of an inlet guard in a non-icing state; and FIG. 3B is a side schematic cross sectional view of an inlet guard in an icing state.

DETAILED DESCRIPTION

Figure 1:
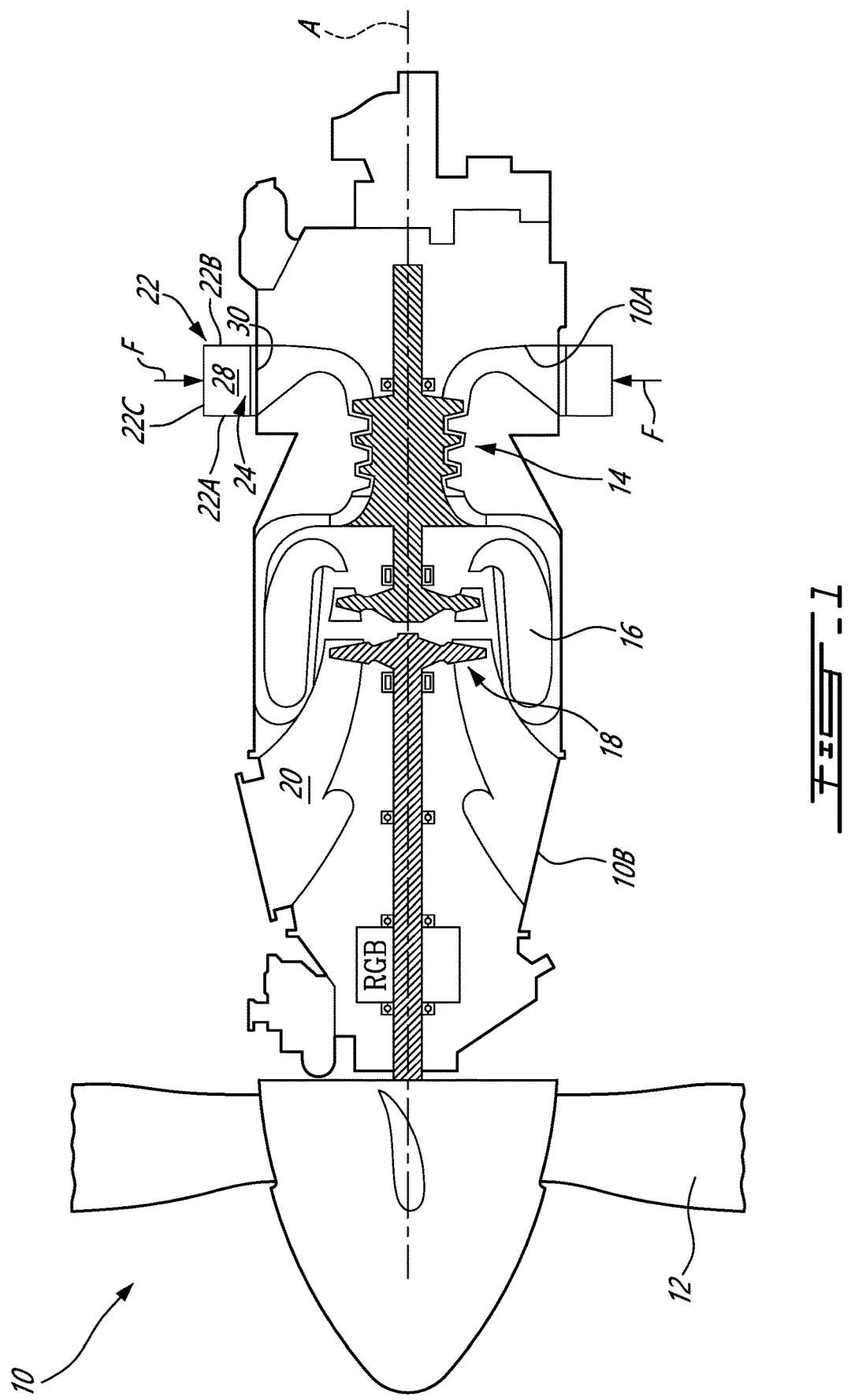
FIG. 1 is a schematic cross sectional view of a gas turbine engine.

FIG. 1 illustrates a turbine engine 10 which may for example be part of an aircraft system. Depending on the implementation of the present technology, the engine 10 could be any type of turbine engine including but not limited to a turbojet engine, a turbofan engine, a turboprop engine, and a turboshaft engine, as well as a hybrid-electric engine. In the illustrated example, the engine 10 is of the turboprop type and generally comprises in serial flow communication, along central axis A, a propeller 12, an inlet duct 10A, a compressor section 14 for pressurizing air drawn from the inlet duct 10A, a combustor section 16 in which the compressed air is mixed with fuel and ignited for generating an annular stream of hot combustion gases, and a turbine section 18 for extracting energy from the combustion gases ultimately expelled through an exhaust duct 10B. A flow path 20 of the engine 10 having opposite ends defined respectively by the inlet duct 10A and the exhaust duct 10B and into which compressor and turbine rotor discs of the compressor and turbine sections 14, 18 extend.

The engine 10 includes an (e.g., annular) airflow inlet structure 22 and an inlet guard 24 (e.g., an inlet screen assembly) The inlet structure 24 is configured to direct air into the engine 10 from an environment external to aircraft, and may be referred to as a static inlet structure 24. This inlet structure 22 may be configured as a standalone structure. Alternatively, the inlet structure 22 may be configured as a part of a housing structure for the engine 10 and/or one or more other components of the aircraft.

The inlet structure 22 includes a (e.g., annular) first or front wall 22A and a (e.g., annular) second or rear wall 22B. Each of these inlet structure walls 22A and 22B extends circumferentially about (e.g., completely around) the engine 10. The front wall 22A is spaced axially along the axis A from the rear wall 22B, thereby providing the inlet structure 22 with an inlet plenum 28; e.g., an internal volume such as an annular cavity. This inlet plenum 28 extends axially along the axis A within the inlet structure 22 between and to the front wall 22A and the rear wall 22B. The inlet plenum 28 extends radially inward (relative to the axis A) within the inlet structure 22 to the gas turbine engine 10 and, more particularly, to an airflow inlet 30 into the engine 10. This engine inlet 30 may be an opening (e.g., an annular orifice) in an outer case of the engine 10 that houses the compressor section 14, the combustor section 16, and turbine section 18.

Under certain circumstances, the air entering the flowpath F through the structure inlet 22C (i.e., ingested by the structure inlet 22C) may include foreign object debris. For example, during winter aircraft operation, some or all of an ice accumulation on an exterior surface of the aircraft may break off and be ingested by the flowpath F through the structure inlet 22C. Large pieces of ice may cause damage to the engine 10 (e.g., to the blades of the compressor rotor and/or vanes within the compressor section 14) if allowed to move freely with the incoming air along the flowpath F into the engine 10 and its compressor section 14. Other relatively large foreign object debris such as a bird may also cause damage to the engine 10 (e.g., to the blades of the compressor rotor and/or vanes within the compressor section 14) if allowed to move freely with the incoming air along the flowpath F into the engine 10 and its compressor section 14.

To prevent or reduce foreign object debris related damage, the inlet guard 24 is arranged along the flowpath F (e.g., anywhere) longitudinally upstream of the compressor section 14 and its compressor rotor. The inlet guard 24 of FIG. 1, for example, is arranged at (e.g., on, adjacent or proximate) the engine inlet 30. More particularly, the inlet guard 24 of FIG. 1 is disposed in (or adjacent) the inlet plenum 28 radially outboard of (or inline with) the engine inlet 30. This inlet guard 24 extends at least partially axially across the flowpath F from the front wall 22a to the rear wall 22b. The inlet guard 24 also extends circumferentially about (e.g., completely around) the axis A. The inlet guard 24 of FIG. 1 thereby laterally overlaps (e.g., completely axially and/or circumferentially covers) the engine inlet 30. This inlet guard 24 fluidly couples a portion of the flowpath F longitudinally upstream of (e.g., radially outboard of) the inlet guard 24 with a portion of the flowpath F longitudinally downstream of (e.g., radially inboard of) the inlet guard 24. With this arrangement, the inlet guard 24 filters (e.g., all of) the air flowing longitudinally within the flowpath F before entering the compressor section 14 and, more generally, the engine 10. The inlet guard 24 may thereby block the foreign object debris from moving along the flowpath F into the engine 10 and its compressor section 14.

Figure 2:
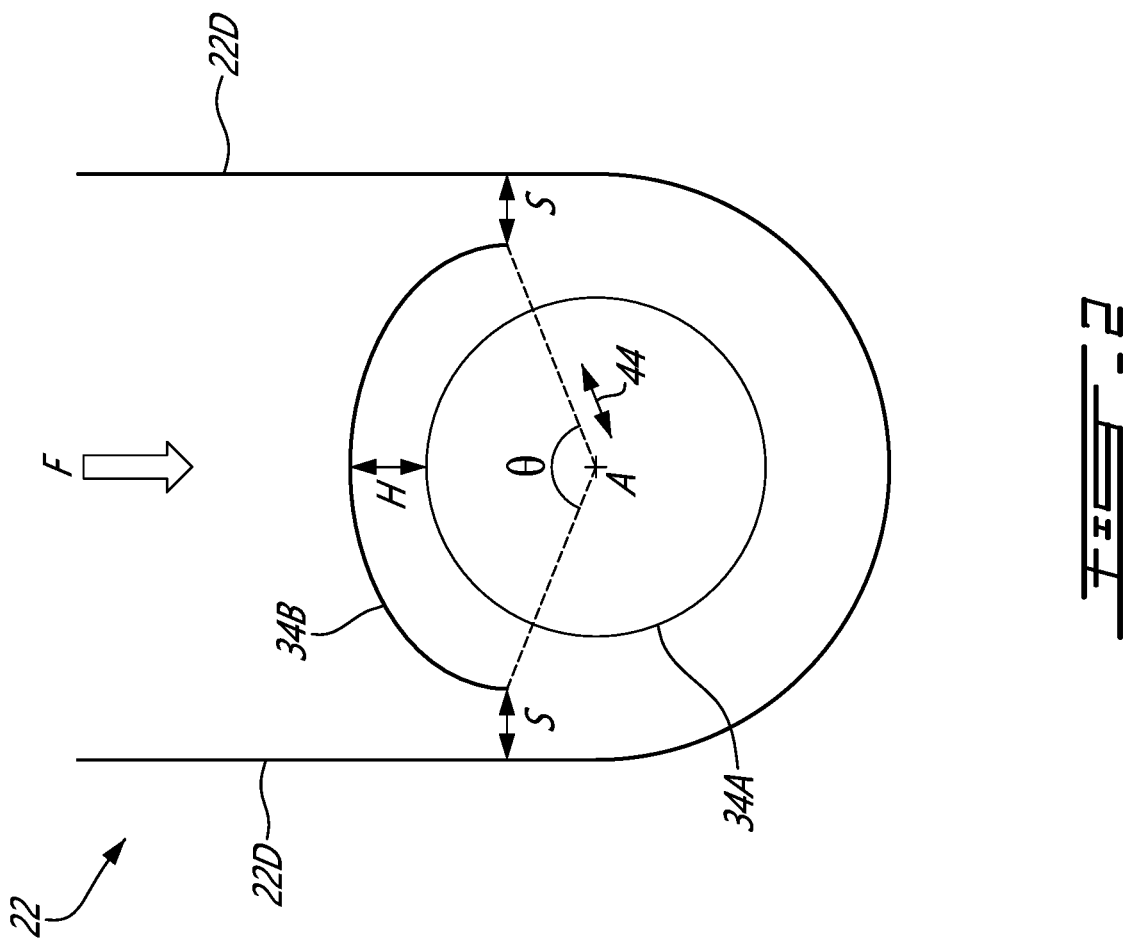
FIG. 2 is a front schematic cross sectional view of an air inlet for a gas turbine engine.

Referring to FIGS. 2-3B, the inlet guard 24 includes a first or downstream screen 34A and a second or upstream screen 34B axially overlapping the first screen 34A. Each of the inlet guard screens 34A, 34B (generally referred to as "34") includes a plurality of screen elements 36A, 36B (generally referred to as "36"); e.g., elongated members, ligaments, etc. These screen elements 36 are arranged in a porous web structure; e.g., a lattice structure. The screen elements 36, for example, are woven together or otherwise arranged and interconnected into a mesh that at least partially or completely forms the respective inlet guard screen 34. With this arrangement, each inlet guard screen 34A, 34B is formed with a plurality of windows 38A, 38B (generally referred to as "38"); e.g., through-holes, ports, etc. Each of these windows 38A, 38B may be formed by and extend axially between a respective axially adjacent pair of the screen elements 36A, 36B. Each of the windows 38A, 38B may also be formed by and extend circumferentially between a respective circumferentially adjacent pair of the screen elements 36A, 36B. Each window 38 may have a polygonal (e.g., rectangular) cross-sectional geometry when viewed, for example, in a reference plane perpendicular to a centerline of the respective window 38. The cross-sectional geometry (e.g., shape, size, etc.) of each window 38 in the first screen 34A may be the same as the cross-sectional geometry (e.g., shape, size, etc.) of each window in the second screen 34B. Alternatively, the cross-sectional geometries of the windows 38 in the same inlet guard screen 34 and/or between the inlet guard screens 34 may be varied. In an embodiment, the windows 38B formed through the second screen 34B are smaller in size (i.e., cross-sectional area) than the windows 38A formed through the first screen 34A. The present disclosure, however, is not limited to such exemplary relationships between the inlet guard screens 34 nor to such exemplary window geometries.

Each of the depicted of the inlet guard screens 34 may extend laterally (e.g., axially and/or circumferentially) across the flowpath F. The first screen 34A is disposed longitudinally downstream of (e.g., radially inboard of) the second screen 34B. The first screen 34A, with a first axial screen width L1, extends axially from the first wall 22A to the second wall 22B. The second screen 34B has a second axial screen width L2 less than the first axial screen width L1 and, as such, does not extend axially from the first wall 22A to the second wall 22B. In the shown case, the second screen 34B is axially centered between the first wall 22A and the second wall 22B (i.e., an axial spacing L3 between edges of the second screen and, respectively, the first wall 22A and the second wall 22B are equivalent). In other cases, the second screen 34B may not be axially centered between the first wall 22A and the second wall 22B, and may be disposed closer, and may even be coupled to, one of the first wall 22A or the second wall 22B. The first screen 34A is circumferentially spaced apart from the second screen 34B in a radial direction 44 (i.e., relative to the central axis A), by a radial height H. The second screen 34B may thus be said to partially shield, block or shadow a portion of the first screen 34A in the radial direction. As will be discussed in further detail below, this partial shielding allows airflow to pass through the shields 34A, 34B despite ice accumulation or accretion.

FIG. 3A shows the inlet guard 24 in its non-icing state condition. In this condition, air in the flowpath F is free to flow through both the second screen 34B and the first screen 34A substantially unhindered, i.e., with no portions of the screens 34A, 34B being blocked. Pressure losses of air in the flowpath F may thus be minimized, while foreign object debris may be captured by the screens 34A, 34B.

FIG. 3B shows the inlet guard 24 in an icing state or condition. In this condition, ice I begins to accumulate or accrete on the screens 34A, 34B. For instance, waterdroplets in the flowpath F may supercool or freeze upon impacting the screens 34A, 34B, thereby forming the ice I. However, as the axially narrower second screen 34B partially blocks the first screen 34A in the radial direction 44, a portion of the first screen 34A along the axial direction, denoted by G in FIG. 3B, is spared from ice accretion. As such, the air along flowpath F may flow unencumbered through the inlet guard 24 as shown in FIG. 3B, i.e., around the axial edges of the second screen 34B and through the spared portion G of the first screen 34A. As the water particles have a higher inertia than the air in the flowpath F as they enter the inlet structure 22, they will not follow the air in the flowpath F and thus will not block the spared portion G.

Referring to FIG. 2, in the shown embodiment, the first screen 34A is shown to have a full hoop (e.g., tubular body), while the second screen 34B is formed of an arcuate segment spanning a predetermined angle θ about the central axis. In various embodiments, the angle θ may be between 20 degrees and 360 degrees (i.e., a full hoop). Other angles may be contemplated. In other embodiments, the first screen 34A and/or the second screen 34B may be configured into multiple arcuate segments. As shown in FIG. 2, a minimum clearance S, for instance, at least 2 inches, may be formed between the second screen 34B and the side walls 22D of the inlet structure 22. Other minimum clearances may be contemplated.

Referring to FIGS. 3A-3B, in some cases the ratio between the second screen axial width L2 and the first screen axial width L1 may be between about 0.2 and 0.7. In some cases, the radial height between the first screen 34A and the second screen 34B is between about 1 and 6 inches. Other values for these parameters may be contemplated.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

In the present disclosure, when a specific numerical value is provided (e.g. as a maximum, minimum or range of values), it is to be understood that this value or these ranges of values may be varied, for example due to applicable manufacturing tolerances, material selection, etc. As such, any maximum value, minimum value and/or ranges of values provided herein (such as, for example only, the above-noted ranges for the ratio L2/L1), include(s) all values falling within the applicable manufacturing tolerances. Accordingly, in certain instances, these values may be varied by ±5%. In other implementations, these values may vary by as much as ±10%. A person of ordinary skill in the art will understand that such variances in the values provided herein may be possible without departing from the intended scope of the present disclosure, and will appreciate for example that the values may be influenced by the particular manufacturing methods and materials used to implement the claimed technology.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A system for an aircraft, comprising:
an aircraft engine having a central axis with a flowpath projecting into the aircraft engine from an airflow inlet;
an inlet plenum at the airflow inlet extending between a front wall and a rear wall along the central axis; and
an inlet guard arranged at the airflow inlet and extending across the flowpath, the inlet guard including a first screen extending circumferentially about the central axis, the first screen having a first screen axial width L1 extending from the front wall to the rear wall, the inlet guard further including a second screen extending at least partially circumferentially about the central axis, the second screen disposed radially outward of the first screen and axially overlapping the first screen, the second screen having a second screen axial width L2 less than the first screen axial width L1.

2. The system as defined in claim 1, wherein:

$$0.2 \leq L2/L1 \leq 0.7.$$

3. The system as defined in claim 1, wherein the second screen is formed of an arcuate segment with an angle between 20 and 360 degrees about the central axis.

4. The system as defined in claim 1, wherein a clearance S of at least 2 inches is formed between the second screen and a side wall of the inlet plenum, the side wall extending between the front wall and the rear wall.

5. The system as defined in claim 1, wherein the second screen is disposed at a radial height H away from the first screen, and wherein the radial height H is between 1 and 6 inches.

6. The system as defined in claim 1, wherein the second screen is axially centered between the front wall and the rear wall.

7. The system as defined in claim 1, wherein windows formed through the second screen are smaller in size than windows formed through the first screen.

8. A system for an aircraft, comprising:
an aircraft engine having a central axis including a compressor section, a flowpath projecting into the aircraft engine from an airflow inlet and through the compressor section;
an inlet plenum at the airflow inlet, extending between a front wall and a rear wall along the central axis; and
an inlet guard arranged at the airflow inlet and extending across the flowpath, the inlet guard including a first screen extending circumferentially about the central axis, the first screen having a first screen axial width L1 extending from the front wall to the rear wall, the inlet guard further including a second screen extending at least partially circumferentially about the central axis, the second screen disposed radially outward of the first screen and axially at a location between the front wall and the rear wall, the second screen having a second screen axial width L2 less than the first screen axial width L1.

9. The system as defined in claim 8, wherein:

$0.2 \leq L2/L1 \leq 0.7$.

10. The system as defined in claim 8, wherein the second screen is formed of an arcuate segment with an angle between 20 and 360 degrees about the central axis.

11. The system as defined in claim 8, wherein a clearance S of at least 2 inches is formed between the second screen and a side wall of the inlet plenum, the side wall extending axially between the front wall and the rear wall.

12. The system as defined in claim 8, wherein the second screen is disposed at a radial height H away from the first screen, and wherein the radial height H is between 1 and 6 inches.

13. The system as defined in claim 8, wherein the second screen is axially centered between the front wall and the rear wall.

14. The system as defined in claim 8, wherein windows formed through the second screen are smaller in size than windows formed through the first screen.

15. A system for an aircraft, comprising:
an aircraft engine having a central axis with a flowpath projecting into the aircraft engine from an airflow inlet; and
an inlet guard configured to reduce ingestion of foreign objects debris by the aircraft engine, the inlet guard including a first screen extending circumferentially about the central axis, the first screen having a first screen axial width L1, the inlet guard further including a second screen extending at least partially circumferentially about the central axis, the second screen disposed radially outward from and at a radial height H away from the first screen, the second screen axially overlapping a portion of the first screen, the second screen having a second screen axial width L2 less than the first screen axial width L1.

16. The system as defined in claim 15, wherein the second screen is formed of an arcuate segment with an angle between 20 and 360 degrees about the central axis.

17. The system as defined in claim 15, further comprising an inlet plenum at the airflow inlet, wherein a clearance S of at least 2 inches is formed between the second screen and a side wall of the inlet plenum, the side wall extending between the front wall and the rear wall.

18. The system as defined in claim 17, wherein the second screen is axially centered in the inlet plenum.

19. The system as defined in claim 15, wherein the radial height H between the first screen and the second screen is between 1 and 6 inches.

20. The system as defined in claim 15, wherein windows formed through the second screen are smaller in size than windows formed through the first screen.

* * * * *